: US 9,112,625 B2
(45) Date of Patent: Aug. 18, 2015

(12) United States Patent
Zhang et al.

(54) METHOD AND APPARATUS FOR EMULATING STREAM CLOCK SIGNAL IN ASYNCHRONOUS DATA TRANSMISSION

(76) Inventors: Guansong Zhang, Santa Clara, CA (US); Tsung-Yi Yang, Lake Forest, CA (US); Cathy Zhang, Lake Forest, CA (US)

( * ) Notice: Subject to any disclaimer, the term of this patent is extended or adjusted under 35 U.S.C. 154(b) by 664 days.

(21) Appl. No.: 12/819,471

(22) Filed: Jun. 21, 2010

(65) Prior Publication Data
US 2011/0311011 A1 Dec. 22, 2011

(51) Int. Cl.
*H04L 7/00* (2006.01)
*H04J 3/06* (2006.01)

(52) U.S. Cl.
CPC .................................... *H04J 3/0632* (2013.01)

(58) Field of Classification Search
CPC ........ H04L 7/0008; H04L 7/02; H04L 7/0331
USPC .......... 375/354, 355, 357, 371; 713/400, 401, 713/500; 370/516, 517
See application file for complete search history.

(56) References Cited

U.S. PATENT DOCUMENTS

| 6,327,273 | B1 | 12/2001 | Van der Putten |
| 6,721,323 | B1 | 4/2004 | Giszczynski |
| 7,212,598 | B2 | 5/2007 | Kliesner |
| 2010/0182993 | A1* | 7/2010 | Jurgensen et al. ............ 370/350 |
| 2010/0195777 | A1* | 8/2010 | Abel et al. .................... 375/359 |

* cited by examiner

*Primary Examiner* — Khai Tran
(74) *Attorney, Agent, or Firm* — Ardent Law Group; Anthony King (57) ABSTRACT

A method and apparatus for emulating stream clock signal in asynchronous data transmission. The inventive subject matter proposes a system consisting of a transmitter module, a receiver module, and a link or network in between. A scheme to generate the emulated stream clock across a wide frequency range is also proposed with the property of controllable deviation from the original stream frequency to meet jitter requirement and fast frequency convergence (minimal number of converging steps). The scheme includes an optional first step to derive a frequency estimation of the stream clock and a second step of continuous adjusting the emulated clock frequency to keep the average frequency equals that of the original stream clock.

27 Claims, 4 Drawing Sheets

METHOD AND APPARATUS FOR EMULATING STREAM CLOCK SIGNAL IN ASYNCHRONOUS DATA TRANSMISSION

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION (1) Field of the Invention

The field of the invention is data transmission.

(2) Description of Related Art Including Information Disclosed Under 37 CFR 1.97 and 1.98

Media extenders or media converters are commonplace in today's digital age, with such devices being incorporated in such industries as machine vision, broadcasting, or personal computer industries. Such devices are used to carry media streams, either video or voice, with constant data rates, from the stream data source, e.g., cameras, video cards, disc players, to the stream data sink, e.g., image capture cards, display panels, image processors, etc. The purpose of using such devices includes long distance transmission, networked switching, intermediate data processing, etc, where the original media stream data needs to be transformed into an appropriate format to serve the purpose and then converted back to its original format before it arrives at the data sink.

Because the original media stream data is transformed and transmitted over an asynchronous link with respect to its original data rate, the stream clocking information is lost. When reconstructing the stream data at the receiver end, a scheme is required to generate an emulated stream clock whose average frequency is the same as the original stream clock so that the stream data can flow through the system continuously and lossless.

Further complications are that for different type of stream data source or different vendor/configuration of the same type of stream data source, the data rates can vary across a big range. For example, the Camera Link™, a widely used interface in the machine vision industry, is defined to have a data clock frequency from 20 MHz to 85 MHz. The DVI interface clock can vary from 25 MHz to 165 MHz. The system should be able to carry over the stream data without knowing the nominal frequency in advance, except the possible frequency range.

There have been previous attempts to generate an emulated stream clock in a data transmission application. Some examples can be found in U.S. Pat. Nos. 6,721,323, 6,072,810 and 7,212,598 (herein incorporated by reference in their entireties).

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

A method and apparatus for emulating stream clock signal in asynchronous data transmission. The inventive subject matter proposes a system consisting of a transmitter module, a receiver module, and a link or network in between. A scheme to generate the emulated stream clock across a wide frequency range is also proposed with the property of controllable deviation from the original stream frequency to meet jitter requirement and fast frequency convergence (minimal number of converging steps). The scheme includes an optional first step to derive a frequency estimation of the stream clock and a second step of continuous adjusting the emulated clock frequency to keep the average frequency equals that of the original stream clock.

The inventive subject matter contemplates transporting a continuous stream of data which is synchronized with a stream clock from a first location, over an independent transmission link, directly or through a packet network, to a second location, where the same stream of data is continuously output along with an emulated stream clock that has exactly the same frequency as the one comes in the first location. The stream clock frequency may vary across a wide range, which should be known to the system. However, the proposed system has no knowledge of the exact frequency in advance. The data stream may be single bit or multiple bits wide where the only limitation is that the aggregated bandwidth, i.e., the product of the data width and the clock frequency, does not exceed the bandwidth provided by the transmission link In an embodiment of the present invention, however, the inventive subject matter consists of a transmitter module in the first location, a receive location in the second location, and at least one connection between them, which in one embodiment may be either a direct transmission or some kind of packet network.

In a preferred embodiment, the inventive subject matter involves a method of generating an emulated stream clock signal in a system transporting a continuous stream of data, said method comprising: (a) formulating a frame structure of the stream data in a transmitter module; (b) adjusting a first stream clock frequency in the receiver module to derive an emulated stream clock frequency; wherein the emulated stream clock frequency is equal to a frequency of a stream clock in the transmitter module; and wherein the first stream clock frequency is one selected from a group consisting of a selected frequency from the frequency of the stream clock in the transmitter module, an average frequency from the frequency of the stream clock in the transmitter module, and an estimated stream clock frequency.

In another embodiment, the inventive subject matter adjusts a first stream clock frequency in the receiver module to derive an emulated stream clock frequency by deriving a first metric value of at least one frame of the frame structure; setting a low limit metric value base on the first metric value; setting a high limit metric value base on the first metric value; and comparing a second metric value of at least one other frame with said low limit and high limit metric values, and adjust the first stream clock frequency if the second metric value is outside of said low limit and high limit metric values.

In yet another embodiment, the first stream clock frequency is the estimated stream clock frequency, and adjusting the first stream clock frequency further comprising calculating a target step size to satisfy a jitter performance of the system; controlling an adjustment step size to adjust the value of a control word derived in a generating step that generates the estimated stream clock frequency; and reducing the adjustment step size at least one adjusting step until the adjustment step size is no larger than the target step size. The first stream clock frequency can be the selected frequency of the stream clock in the transmitter module and the selected frequency from the frequency of the stream clock in the transmitter module can be randomly selected. In a preferred embodiment, a maximum number of stream clock adjustment steps is:

$$\left\lceil 2 \times \log_2\left(\frac{d_1}{d_2}\right)\right\rceil;$$

Wherein $d_1$ is an initial value of the adjustment step size;
Wherein $d_2$ is the target step size; Where $$\left\lceil 2 \times \log_2\left(\frac{d_1}{d_2}\right)\right\rceil$$

is the smallest integer no less than $$2 \times \log_2\left(\frac{d_1}{d_2}\right).$$

In one embodiment of the inventive subject matter, the method of adjusting the first stream clock frequency comprises an average frequency of the stream clock in the transmitter module. For example, the average frequency of the stream clock can be defined in one embodiment by $(f_{tl}+f_{th})/2$ and wherein the method of adjusting the first stream clock frequency further comprising calculating a target step size of the adjusting the first stream clock frequency to satisfy a jitter performance of the system; controlling an adjustment step size to adjust the value of the first stream clock frequency and reducing the adjustment step size at each adjusting step until the adjustment step size is no larger than the target step size wherein $f_{tl}$ is a lowest frequency of the stream clock frequency range and wherein $f_{th}$ is a highest the frequency of the stream clock frequency range. In addition, the method of adjusting the first stream clock frequency wherein the first stream clock frequency is the estimated stream clock frequency.

Another aspect of the method of adjusting the first stream clock frequency of the inventive subject matter is generating the estimated stream clock frequency in a receiver module by having a reference clock in the transmitter and generating a clock date snapshot (CDS) in the frame structure of the stream data in the transmitter, wherein the CDS is associated with a number of stream clock cycles in the stream data frame. In addition, the method of adjusting the first stream clock frequency of inventive subject matter is generating the estimated stream clock frequency in a receiver module having a reference clock in the receiver which uses the CDS as part of step generating an estimated stream clock frequency in a receiver module and may use a counter, an accumulator and a reference clock at the receiver to calculate the estimated stream clock frequency.

In one contemplated embodiment the method of adjusting the first stream clock frequency of inventive subject matter is generating the estimated stream clock frequency in a receiver module comprises the formula:

$$f_e = \frac{A}{C} \times f_r$$

Wherein $f_e$ is the estimated stream clock frequency in the receiver module;
Wherein A is a value from an accumulator;
Wherein C is a value from a counter; and
Wherein $f_r$ is a frequency of the reference clock at the receiver.

In addition, the method of adjusting the first stream clock frequency of inventive subject matter generating the estimated stream clock frequency in a receiver module having a reference clock in the transmitter; allocating a data portion in the frame structure of the stream data in the transmitter, wherein the data portion carries the stream data; having a reference clock in the receiver; using a property of the stream data as part of the step generating the estimated stream clock frequency in the receiver module. In one embodiment, the property of the stream data is an amount of the stream data wherein the generating step includes a calculation using the formulas:

$$f_e = f_r \times \frac{W_e}{2^N}$$

and $$W_e = \frac{A'}{w \times C} \times 2^N$$

Wherein $f_e$ is the estimated stream clock frequency in the receiver module;
Wherein A' is a value from an accumulator;
Wherein C is a value from a counter;
Wherein w is an input stream data width;
Wherein $W_e$ is an estimated control word; and
Wherein $f_r$ is a frequency of the reference clock at the receiver.

In yet another embodiment of the inventive subject matter providing a system of transporting a continuous stream of data, comprising: a stream clock in a transmitter module; a continuous stream of data from the transmitter module, wherein the continuous stream of data is synchronized with the stream clock in the first location; an independent transmission link, wherein the stream of data is transmitted from the transmitter module to a receiver module; an emulated stream clock in the a receiver module, wherein a frequency of the emulated stream clock is synchronized with the frequency of the stream clock in the transmitter module; and wherein the stream of data is synchronized with the emulated stream clock in an output of the receiver module.

The system described above, wherein the emulated stream clock frequency is derived from adjusting a first stream clock frequency in the receiver module, wherein the first stream clock frequency is one selected from a group consisting of a selected frequency from the stream clock in the transmitter module, an average frequency from the stream clock in the transmitter module, and an estimated stream clock frequency, and wherein the first stream clock frequency is adjusted by: deriving a first metric value of at least one frame of the frame structure; setting a low limit metric value base on the first metric value; setting a high limit metric value base on the first metric value; comparing a second metric value of at least one other frame with said low limit and high limit metric values, and adjust the estimated stream clock frequency if the second metric value is outside of said low limit and high limit metric values.

In addition, the adjusting step of the above system further comprising: calculating a target step size of the adjusting step to satisfy a jitter performance of the system; controlling an adjustment step size to adjust the value of a control word derived in the estimated stream clock frequency generating step; reducing the adjustment step size at least one adjusting step until the adjustment step size is no larger than the target step size wherein the maximum number of adjustment steps is $$\left\lceil 2 \times \log_2\left(\frac{d_1}{d_2}\right)\right\rceil;$$

wherein $d_1$ is an initial value of the adjustment step size;
wherein $d_2$ is the target step size;
Wherein $$\left\lceil 2 \times \log_2\left(\frac{d_1}{d_2}\right)\right\rceil$$

is the smallest integer no less than $$2 \times \log_2\left(\frac{d_1}{d_2}\right).$$

The system as recited above, wherein the first stream clock frequency is said selected frequency from the frequency of the stream clock in the transmitter module and said selected frequency from the frequency of the stream clock in the transmitter module is randomly selected. In addition, the system as recited above, wherein the first stream clock frequency is said average frequency from the frequency of the stream clock in the transmitter module. The average frequency of the stream clock is defined by $(f_{tl}+f_{th})/2$; and wherein adjusting the first stream clock frequency in the receiver module further comprises calculating a target step size of adjusting the first stream clock frequency in the receiver module to satisfy a jitter performance of the system; controlling an adjustment step size to adjust the value of the first stream clock frequency and reducing the adjustment step size at each at least one adjusting step until the adjustment step size is no larger than the target step size;

Wherein $f_{tl}$ is a lowest frequency of the stream clock frequency range;
Wherein $f_{th}$ is a highest the frequency of the stream clock frequency range.

In one embodiment, the system of the present inventive subject matter described above wherein the first stream clock frequency is said selected frequency of the stream clock in the transmitter module and wherein said selected frequency from the frequency of the stream clock in the transmitter module is randomly selected. In addition, the system described above wherein the first stream clock frequency is said average frequency from the frequency of the stream clock in the transmitter module. In the system of the inventive subject matter wherein the average frequency of the stream clock is defined by $(f_{tl}+f_{th})/2$;
and wherein adjusting the first stream clock frequency in the receiver module further comprises calculating a target step size of adjusting the first stream clock frequency in the receiver module to satisfy a jitter performance of the system; controlling an adjustment step size to adjust the value of the first stream clock frequency and reducing the adjustment step size at each at least one adjusting step until the adjustment step size is no larger than the target step size;

Wherein $f_{tl}$ is a lowest frequency of the stream clock frequency range;
Wherein $f_{th}$ is a highest the frequency of the stream clock frequency range.

The system described above wherein the first stream clock frequency is the estimated stream clock frequency.

The system as recited above wherein the estimated stream clock frequency is generated in the receiver module by having a reference clock in the transmitter, generating clock date snapshot (CDS) in the frame structure of the stream data in the transmitter, wherein the CDS is associated with a number of stream clock cycles in the stream data frame, having a reference clock in the receiver; using the CDS as part of the step generating an estimated stream clock frequency in a receiver module, using a counter, an accumulator, and the reference clock at the receiver to calculate the estimated stream clock frequency.

In addition, the system as described above, wherein the calculation comprises the formula:

$$f_e = \frac{A}{C} \times f_r$$

wherein $f_e$ is the estimated stream clock frequency in the receiver module;
wherein $A$ is a value from the accumulator;
wherein $C$ is a value from the counter; and
wherein $f_r$ is a frequency of the reference clock at the receiver.

In another embodiment, the system of the inventive subject matter described above wherein the estimated stream clock frequency is generated in the receiver module by having a reference clock in the transmitter; allocating a data portion in the frame structure of the stream data in the transmitter, wherein the data portion carries the stream data; having a reference clock in the receiver; using a property of the stream data as part of the step generating the estimated stream clock frequency in the receiver module; and wherein the property of the stream data is an amount of the stream data.

In addition, the system as described above, wherein the generating step includes a calculation using the formulas:

$$f_e = f_r \times \frac{W_e}{2^N} \text{ and } W_e = \frac{A'}{w \times C} \times 2^N$$

wherein $f_e$ is the estimated stream clock frequency in the receiver module;
wherein $A'$ is a value from the accumulator;
wherein $C$ is a value from the counter;
wherein $w$ is an input stream data width;
wherein $W_e$ is an estimated control word; and
wherein $f_r$ is a frequency of the reference clock at the receiver.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

Figure 1:
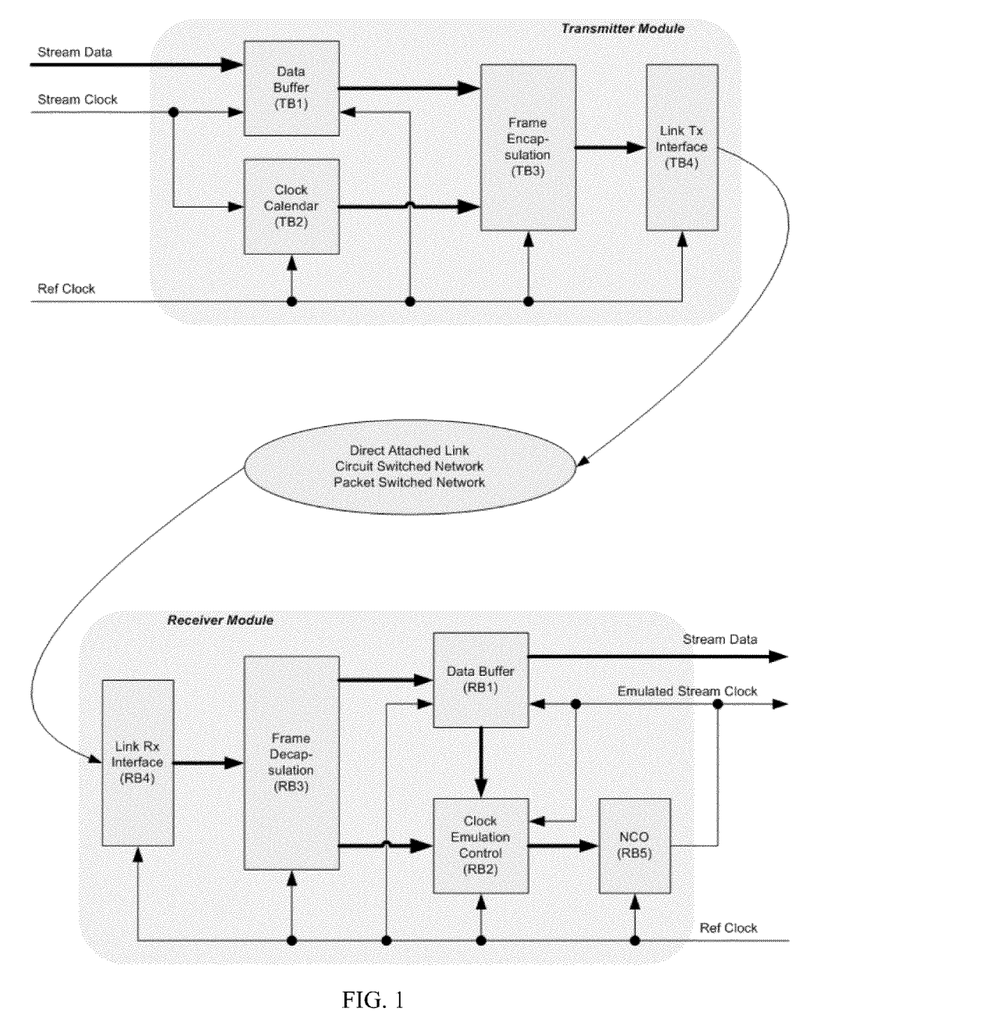
FIG. 1 is an illustration of an embodiment of the subject matter of the present invention's system diagram.

Referring now to FIG. 1, the system consists of a transmitter module in the first location, a receiver module in the second location, and the connections in between them, which is either a direct transmission link or some kinds of packet network.

Transmitter Module

The stream data (TDs) along with the stream clock (TCs) arrives at the transmitter module and is temporarily stored into a data buffer block (TB1). TB1 may incorporate functions to transform the incoming stream data into certain format that is appropriate for further processing and storage. The stream clock TCs is also fed into a clock calendar block (TB2) to generate frequency related information associated with it. The outputs of TB1 and TB2 connect to a Frame Encapsulation block (TB3) where both the stream data from TB1 and the stream clock related information from TB2 are packed into a frame which may also include other auxiliary components like header, trailer, and inter-frame gap that are necessary for the proper operation of the transmission link or network. The formulated frame from TB3 then goes to the Link Tx Interface block (TB4). TB4 serves the necessary functions to physically transmit the signal that carries the formulated frame to the receiver or a network. Such functions may include, but not limited to, data encoding, serialization, modulation, and electric-to-optic conversion. An independent reference clock TCr is provided to operate TB3, TB4, and part of TB1 and TB2. The frequency of TCr is fixed and determined by the transmission link bandwidth and/or the network to which it is connected.

Receiver Module

Next, the Link Rx Interface block RB4 physically receives the signal from the transmission link or network and convert it back to the frame formulated at the transmitter module. The necessary functions to accomplish this may include, but not limited to, optic-to-electric conversion, parallelization, word boundary alignment, and decoding. The converted frame is fed into the Frame De-capsulation block RB3, where the auxiliary components such as headers, trailers, and inter-frame gaps are stripped off. The stream data and stream clock related information inside the frame are also extracted and sent to the Data Buffer block RB1 and Clock Emulation Control block RB2, respectively. Besides the stream clock related information, other information, such as the frame arrival events and the amount of stream data carried in each arrived frame from RB3 and the amount of stream data currently inside RB1 are also sent to RB2 repetitively. By using all these provided information, RB2 controls a Numerical Controlled Oscillator block (RB5) to generate the emulated stream clock RCs, which is used to read out the stream data from RB1. Once the emulated stream clock is correctly generated, the Data Buffer RB1 will never be empty or full which guarantees a continuous stream of data flowing out of the Receiver module. This requires the emulated clock RCs to have exactly the same frequency as TCs. An independent reference clock RCr, which has the same nominal frequency as TCr (they may have ppm frequency difference), is provided to operate RB4, RB3, RB2, RB5, and part of RB1.

Figure 2:
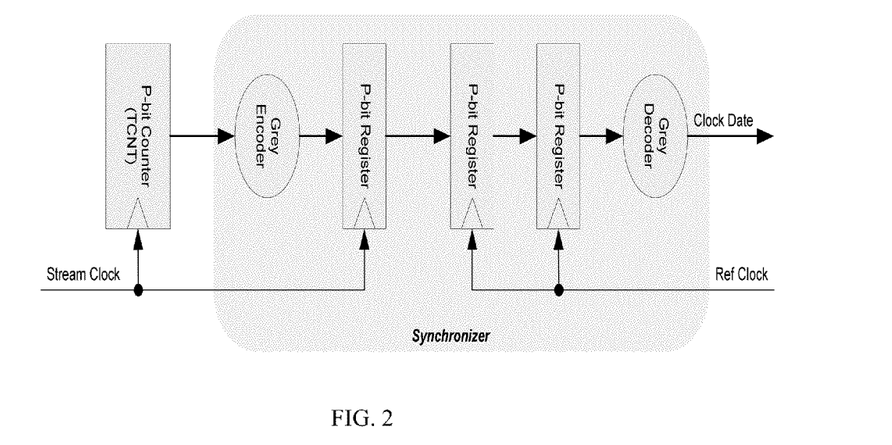
FIG. 2 is a diagram of an embodiment of the subject matter of the present invention's clock calendar block.

Turning to FIG. 2, shows the Clock Calendar block in the transmitter module. The stream clock TCs drives a P-bit wide free-running counter TCNT, which means for every clock cycle of TCs, TCNT will be incremented by 1, just like a calendar. The output of TCNT is synchronized into the reference clock TCr domain through a synchronizer, which can be implemented using a grey encoding and decoding scheme. We refer to this synchronized output as the Clock Date (CD) of TCs.

Method of Clock Emulation

Figure 3:
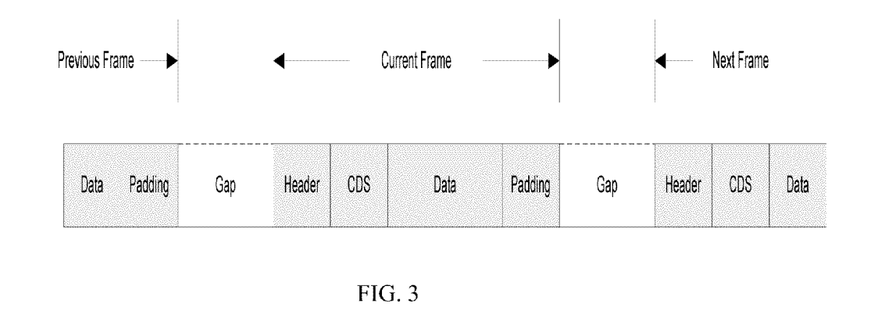
FIG. 3 is an example of the subject matter of the present invention's frame structure.

FIG. 3 depicts a simplified example of the frame structures formulated at the transmitter. Each frame starts with a Header field, which marks the beginning of a frame and contains other information such as the type and length of the following data carried by the frame. Following the Header, there is a field called CDS (Clock Date Snapshot), which is the CD output value from the Clock Calendar block at the time this CDS field is formulated by the Frame Encapsulation block. After the CDS field, the frame may carry the stream data. The amount of stream data carried in each frame can be fixed or varied across different frames. It can also be zero which means a certain frame only carries the header and the CDS field. In between the frames, there may be gaps or the so-called "inter-frame-gaps". They are normally specially encoded so that the receiver would know it contains no useful information. It is also possible not to use any inter-frame-gaps, which means frames are packed back-to-back for transmission. It is noteworthy to mention the bit width P of the counter TCNT in the Clock Calendar block has a lower bound. TCNT should be wide enough to guarantee that from the formulation of the CDS of one frame until the formulation of the CDS of the next frame, the TCNT cannot run a full circle, i.e., it cannot count for more than 2^P times. This condition must be met to ensure correct clock emulation at the receiver module. A Numeric Controlled Oscillator (NCO) operates with a reference clock input with frequency $f_{nr}$ and an N-bit wide control word input $W_c$. It outputs a clock signal with a frequency $f_{no}$ that can be calculated as below. Generally, an NCO with such property is implemented using a Direct Digital Synthesizer (DDS).

The clock emulation control block generates the frequency control word to the NCO which further controls the emulated clock frequency. The emulation control procedure consists of two major steps. Because the receiver module has no knowledge of nominal frequency of the stream clock TCs, the first step is to derive an estimated clock frequency $f_e$ such that its deviation to the actual frequency $f_t$ of TCs is less than a small constant. The smaller the constant, more accurate the frequency estimation is. The second step takes this frequency estimation as a starting point and continuously adjusts the emulated clock frequency to maintain the averaged frequency equals $f_t$ and meet the output clock jitter requirement.

Figure 4:
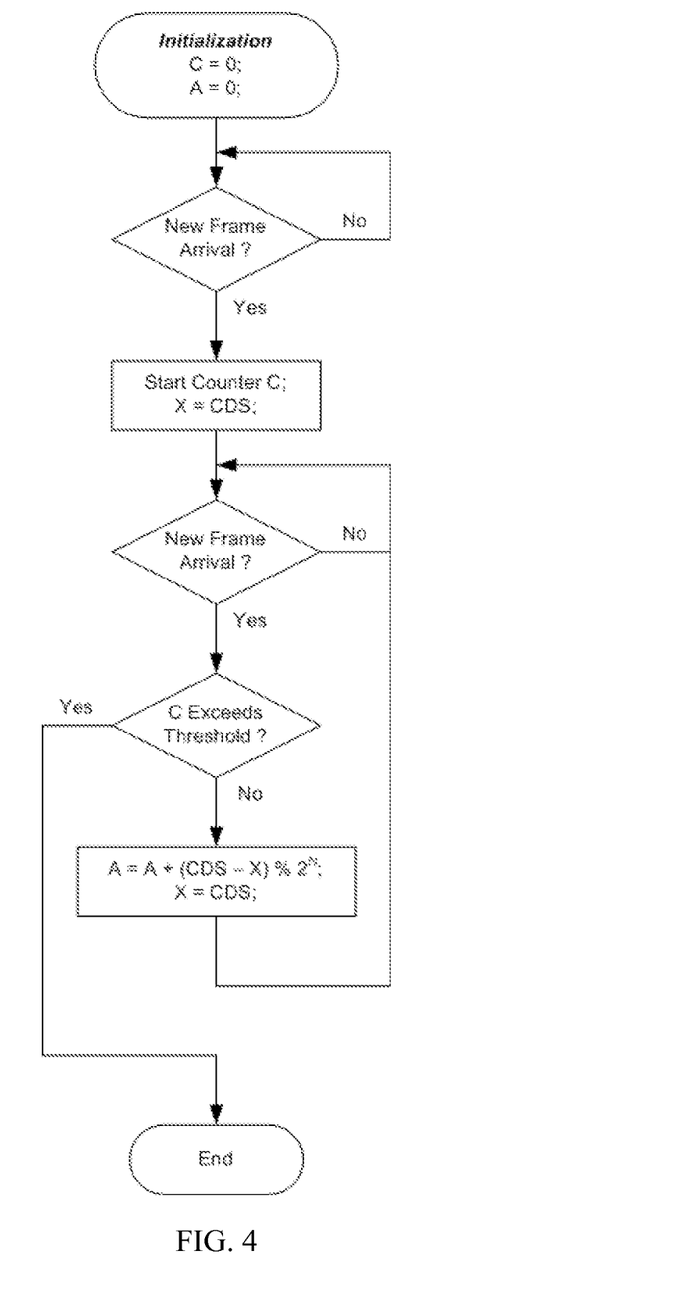
FIG. 4 is an example of a flow diagram of an embodiment of the subject matter of the present invention's frequency estimation step.

Two methods can be used in the first step to derive the frequency estimation. The first method uses the CDS value in the received frames and is depicted in FIG. 4. The counter C operates on the receiver reference clock RCr and start counting upon the arrival of the first frame after initialization. Starting from the second frame, the accumulator A is incremented by the difference of the current CDS value and the CDS value from previous frame. Please note the difference is calculated with modulo $2^N$ subtraction. This operation is repeated on each following frames until the counter C exceeds a pre-defined threshold. The final value of C records the number of RCr clock cycles during a time period T from the arrival of the first frame to the arrival of the last frame. The final value of A records the approximate number of TCs clock cycles during the same period. It can be derived that $$f_e = \frac{A}{C} \times f_r$$

(where $f_r$ is the frequency of RCr)
The control word to the NCO is calculated as, $$W_e = \frac{A}{C} \times 2^N$$

The second method uses the same control flow as the first one. The counter C also operates in the same manner. However, it does not use the CDS value from the received frames. Instead, an accumulator A' is used to add up the amount of stream data carried in the received frame, the information of which should reside in the header field of the frame. The final value of A' records the total amount of data transfer during the time period T. Given the input stream data width w, it's straightforward to derive the number of clock cycles A" it takes the stream clock TCs to transfer these data into the system. A" is calculated as below, $$A'' = \frac{A'}{w}$$

Now the A" is equivalent with the accumulator A used in the first method. So the control word to the NCO is calculated as, $$W_e = \frac{A'}{w \times C} \times 2^N$$

The deviation of the estimated frequency from the actual TCs frequency is primarily caused by the delay variations of the data transfer path. It includes the intrinsic delay variations of the Clock Calendar block, the Link Tx Interface block, and Link Rx interface block, mainly induced by the clock domain transfer operations. But these intrinsic delay variations are generally small. The transmission slam delay variation is another contributor. For a direct connected link or a circuit switched network, the variation is minimal. However, for a packet based network, the delay variation is generally big and becomes the dominant factor. It is reasonable to assume that for a given system there is an upper limit on the delay variation. This also puts an upper limit on the deviation of the estimated frequency. Extending the time period T, i.e., increasing the final value of counter C, helps to reduce the deviation upper limit. However, it means the first step will take longer time to finish and it's not an efficient way to reduce the frequency deviation, as we'll explain in the second step.

The operations in the second step have two objectives. The first objective is to keep the average frequency of the emulated stream clock equal to $f_t$, the actual frequency of the TCs. This is realized by repeatedly adjust the frequency of the emulated clock so that it swings around $ff_t$. Because each time the emulated clock is adjusted, the clock cycle will be stretched or compressed at a certain time. This change is reflected as clock jitter and smaller adjustment scale helps to reduce the clock jitter. Therefore, the second objective is to reduce the deviation to a certain level to meet the output stream clock jitter performance.

In the process of repetitive frequency adjustments, certain criteria are needed to guide the direction of each adjustment, either increasing or decreasing the frequency. In the current system, two metrics can serve the purpose.

The first metric is calculated by comparing the CDS value from each frame against a locally generated clock date snapshot, CDS', which operates on the emulated stream clock. CDS' is generated in the same way as the CDS from the transmitter module. The emulated stream clock drives a P-bit wide counter RCNT, the output of which is synchronized into the RCr clock domain through a synchronizer using grey encoding and decoding. Upon the arrival of each frame, the current value of the synchronized RCNT output becomes CDS' and the CDS value in the frame is subtracted by the CDS'. The result of the subtraction is used as the first metric. In the beginning of the second step, after the emulated stream clock is successfully generated with the estimated frequency calculated in the first step, the metric is recorded upon the arrival of the first frame as $M_c$, also called the central mark. On the arrival of each following frame, a new metric value is calculated and compared with $M_c$, to guide the frequency adjustments process so that the new metric value is always close to $M_c$.

The second metric uses the amount of stream data stored in the data buffer block in the units of either bits or words. Please note that in the first step, the stream data contained in the received frame is not stored in the data buffer because the emulated clock is not generated yet. In the second step, after the emulated stream clock is successfully generated with the estimated frequency calculated in the first step, the stream data contained in the received frames start to be put into the data buffer. On each arrival of a new frame, the amount stream data stored in the buffer is checked and if the value is exceeds half of the data buffer capacity, the stream data starts to be read out of the data buffer using the emulated stream clock and the value is recorded as the central mark, $M_c$. On the arrival of each following frame, the amount of stream data in the buffer is compared with $M_c$ to guide the frequency adjustments process. The target is also to keep the value close to $M_c$. After obtaining the central mark $M_c$, either metric can be used to guide the frequency adjustment process shown in FIG. 5. In this process, two additional marks, low mark and high mark, denoted as $M_l$ and $M_h$, are used to guard the metric deviation and detect if the emulated clock frequency is lower or higher than $f_t$. The initial value of $M_l$ and $M_h$ is set to $(M_c-s)$ and $(M_c+s)$, respectively, where s is a small constant. We call $M_l$ and $M_h$ opposite mark with respect to each other. On the arrival of a frame, a new metric value $M_n$ is obtained and compared with the two marks. If $M_n$ is less than $M_l$, it means the current emulated clock frequency is higher than $f_t$. In this case, the emulated clock will be adjusted slower. At the same time, $M_l$ is decreased by s, so that if the adjusted clock frequency is still higher than $f_t$, it can be detected later on. The opposite mark $M_h$ is reset to its initial value of $(M_c+s)$. Similarly, if $M_n$ is more than $M_h$, it means the current emulated clock frequency is lower than $f_t$. In this case, the emulated clock will be adjusted faster. At the same time, $M_h$ is increased by s, so that if the adjusted clock frequency is still lower than $f_t$, it can be detected later on. The opposite mark $M_l$ is reset to its initial value of $(M_c-s)$.

Figure 5:
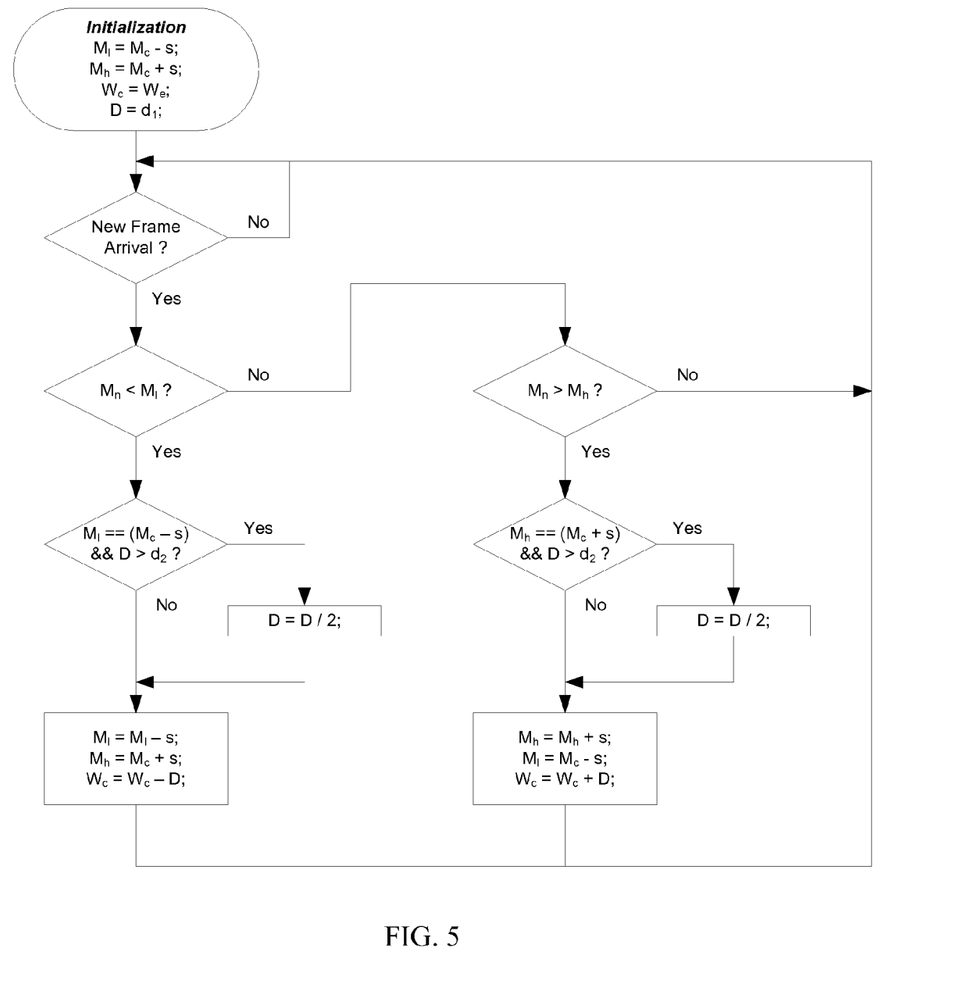
FIG. 5 is an example of a flow diagram of an embodiment of the subject matter of the present invention's frequency adjustment control.

The frequency adjustment process operates on the control word $W_c$ to the NCO, which has a linear relationship with the emulated stream clock frequency. $W_c$ is initialized to the control word value derived in the first step. Another variable D denotes the control word adjustment step size. It is initialized to $d_1$, corresponding to the maximum estimated frequency deviation from the initial estimated frequency in the first step to $f_t$. The value of $d_1$ may be a relatively large, e.g., the transmission goes through a packet network, which cannot meet the output clock jitter requirement. Therefore, we calculate a target step size $d_2$ that can satisfy the jitter performance. In the adjustment process, the step size D is gradually reduced. Each time the frequency adjustment changes direction, i.e., from increasing to decreasing and vice versa, the step size D is reduced by half until D is smaller or equal to $d_2$. After that, D is kept constant and the emulated frequency should alternate around the target frequency $f_t$. Based on this process, it takes at most $2*\log_2(d1/d2)$ adjustments or steps for the step size D to reach the target size $d_2$. Normally, this is a more efficient way to reduce the emulated clock frequency deviation than extending time period T in the first step, especially when the d1/d2 ratio is large.

In fact, the whole stream clock emulation process can also use the second step alone without performing the frequency estimation with the first step. Let us assume the input stream clock TCs has a frequency range of $[f_{tl}, f_{th}]$. We can initialize the $W_c$ to the value corresponding to the central frequency of the range, which is $(f_{tl}+f_{th})/2$. And the value of d1 equals half of the range size, which is $(f_{tl}-f_{th})/2$. In this case, the NCO is required to have a relatively quicker response to the control word change. The data buffer should have a larger size and the CDS/CDS' should have a larger bit width to cope with the rapid metric value change due to the initial large frequency deviation from the emulated stream clock to $f_t$. However, it simplifies the whole emulation control process, which may be desirable in certain scenarios.

With the presence of data transfer delay variation between the transmitter and receiver module, the metric value is directly affected by such variations. If the variation is small, e.g., if a direct link or circuit switched network is used, the mark spacing s should be sufficient to filter out the metric variations. However, if the variation is large, a certain form of digital filter should be used to smooth out the metric values before they are fed into the adjustment control process. For example, a moving average digital filter can be used. The output of this filter is the average value of the previous n samples or metric values. The use of a digital filter can prevent the metric comparison from generating erroneous results, which directly affects the frequency adjustments.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Thus, specific embodiments and applications of method and methods for emulating stream clock signal in asynchronous data transmission have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. A method of generating an emulated stream clock signal in a system transporting a stream data, said method comprising:
   (a) formulating a frame structure of the stream data; and
   (b) adjusting a first stream clock frequency to derive an emulated stream clock frequency.

2. The method as recited in claim 1, wherein step 1(b) further comprises:
   comparing a second metric value of at least one other frame with said low limit and high limit metric values, and adjust the first stream clock frequency if the second metric value is outside of said low limit and high limit metric values.

3. The method as recited in claim 1, wherein step 1(b) further comprises:
   calculating a target step size of the step 1(b) to satisfy a jitter performance of a system;
   controlling an adjustment step size to adjust a value of a control word derived in a generating step that generates an estimated stream clock frequency.

4. The method as recited in claim 2, wherein a maximum number of adjustment steps is $$\left[2 \times \log_2\left(\frac{d_1}{d_2}\right)\right];$$

wherein $d_1$ is an initial value of the adjustment step size; wherein $d_2$ is the target step size; and wherein $$\left[2 \times \log_2\left(\frac{d_1}{d_2}\right)\right]$$

is the smallest integer no less than $$2 \times \log_2\left(\frac{d_1}{d_2}\right).$$

5. The method as recited in claim 1, wherein the first stream clock frequency is in the transmitter module.

6. The method as recited in claim 2, wherein the first stream clock frequency is said selected frequency from the frequency of the stream clock.

7. The method as recited in claim 1, wherein said selected frequency from the frequency of the stream clock in the transmitter module is randomly selected.

8. The method as recited in claim 1, wherein the first stream clock frequency is said average frequency from the frequency of the stream clock in the transmitter module.

9. The method as recited in claim 2, wherein the average frequency of the stream clock is defined by $(f_{tl}+f_{th})/2$; and wherein step 1(b) further comprises:
   calculating a target step size of the step 1(b) to satisfy a jitter performance of the system;
   controlling an adjustment step size to adjust the value of the first stream clock frequency, and
   wherein $f_{tl}$ is a lowest frequency of the stream clock frequency range; and
   wherein $f_{th}$ is a highest frequency of the stream clock frequency range.

10. The method as recited in claim 1, wherein the first stream clock frequency is the estimated stream clock frequency.

11. The method as recited in claim 1, and the method further comprising generating the estimated stream clock frequency in the receiver module by:
    having a reference clock in the transmitter; and
    generating a clock date snapshot (CDS) in the frame structure of the stream data in the transmitter, wherein the CDS is associated with a number of stream clock cycles in the stream data frame.

12. The method as recited in claim 8, further comprising:
    having a reference clock in the receiver; and
    using the CDS as part of the step generating an estimated stream clock frequency in the receiver module.

13. The method as recited in claim 8, further comprising:
    using a counter, an accumulator, and the reference clock at the receiver to calculate the estimated stream clock frequency.

14. The method as recited in claim 13, wherein the calculation comprises the formula:

$$f_e = \frac{A}{C} \times f_r$$

wherein C is a value from a counter; and
wherein $f_r$ is a frequency of the reference clock at the receiver.

15. The method as recited in claim 11, wherein the property of the stream data is an amount of the stream data; and
    wherein the first stream clock frequency is one selected from a group consisting of a selected frequency from the frequency of the stream clock in the transmitter module, an average frequency from the frequency of the stream clock in the transmitter module, and an estimated stream clock frequency.

16. The method as recited in claim 8, wherein the generating step includes a calculation using the formulas:

$$f_e = f_r \times \frac{W_e}{2^N} \text{ and } W_e = \frac{A'}{w \times C} \times 2^N$$

wherein $f_e$ is the estimated stream clock frequency in the receiver module;
wherein A' is a value from an accumulator;
wherein $W_e$ is an estimated control word; and
wherein $f_r$ is a frequency of the reference clock at the receiver.

17. A system of transporting data, comprising:
    a stream clock;
    a continuous stream of data from a transmitter module;
    an independent transmission link, wherein the stream of data is transmitted from the transmitter module to a receiver module.

18. The system as recited in claim 17, wherein a emulated stream clock frequency is derived from adjusting a first stream clock frequency in the receiver module, wherein a first stream clock frequency is one selected from a group consisting of a selected frequency from the stream clock in the transmitter module, an average frequency from the stream clock in the transmitter module, and an estimated stream clock frequency, and wherein the first stream clock frequency is adjusted by:

setting a high limit metric value base on the first metric value; and comparing a second metric value of at least one other frame with said low limit and high limit metric values, and adjust the estimated stream clock frequency if the second metric value is outside of said low limit and high limit metric values.

19. The system as recited in claim 18, wherein the adjusting step further comprising:

calculating a target step size of the adjusting step to satisfy a jitter performance of the system;

controlling an adjustment step size to adjust the value of a control word derived in the estimated stream clock frequency generating step.

20. The system as recited in claim 19, wherein a maximum number of adjustment steps is $$\left[2 \times \log_2\left(\frac{d_1}{d_2}\right)\right];$$

wherein $d_1$ is an initial value of the adjustment step size; wherein $d_2$ is the target step size; and wherein $$\left[2 \times \log_2\left(\frac{d_1}{d_2}\right)\right]$$

is the smallest integer no less than $$2 \times \log_2\left(\frac{d_1}{d_2}\right).$$

21. The system as recited in claim 20, wherein the first stream clock frequency is said selected frequency from the frequency of the stream clock in the transmitter module.

22. The system as recited in claim 20, wherein said selected frequency from the frequency of the stream clock in the transmitter module is randomly selected.

23. The system as recited in claim 19, wherein the first stream clock frequency is said average frequency from the frequency of the stream clock in the transmitter module; and wherein the stream of data is synchronized with the emulated stream clock in an output of the receiver module.

24. The system as recited in claim 22, wherein the average frequency of the stream clock is defined by $(f_{tl}+f_{th})/2$, and wherein adjustment of the first stream clock frequency also comprises the steps of:

calculating a target step size of the step 1(b) to satisfy a jitter performance of the system;

wherein $f_{tl}$ is a lowest frequency of the stream clock frequency range; and wherein $f_{th}$ is a highest the frequency of the stream clock frequency range.

25. The system as recited in claim 24, wherein the first stream clock frequency is the estimated stream clock frequency.

26. The system as recited in claim 24, wherein the estimated stream clock frequency is generated in the receiver module by:

having a reference clock in the transmitter;

generating clock date snapshot (CDS) in the frame structure of the stream data in the transmitter, wherein the CDS is associated with a number of stream clock cycles in the stream data frame;

using the CDS as part of the step generating an estimated stream clock frequency in the receiver module; and using a counter, an accumulator, and the reference clock at the receiver to calculate the estimated stream clock frequency.

27. The system as recited in claim 26, wherein the calculation comprises the formula:

$$f_e = \frac{A}{C} \times f_r$$

wherein $f_e$ is the estimated stream clock frequency in the receiver module;

wherein A is a value from the accumulator;

wherein C is a value from the counter; and wherein $f_r$ is a frequency of the reference clock at the receiver.

* * * * *